US010940506B2

(12) United States Patent
Cho et al.

(10) Patent No.: US 10,940,506 B2
(45) Date of Patent: Mar. 9, 2021

(54) HAPTIC ACTUATOR WITH LINEAR AND ROTATIONAL MOVEMENT

(71) Applicant: CENTER OF HUMAN-CENTERED INTERACTION FOR COEXISTENCE, Seoul (KR)

(72) Inventors: Jai Hi Cho, Seoul (KR); Shin Young Kim, Seoul (KR); Dae Keun Yoon, Seoul (KR); Joong Jae Lee, Seoul (KR); Bum Jae You, Seoul (KR)

(73) Assignee: CENTER OF HUMAN-CENTERED INTERACTION FOR COEXISTENCE

(*) Notice: Subject to any disclaimer, the term of this patent is extended or adjusted under 35 U.S.C. 154(b) by 145 days.

(21) Appl. No.: 16/086,980

(22) PCT Filed: Mar. 23, 2017

(86) PCT No.: PCT/KR2017/003153
§ 371 (c)(1),
(2) Date: Sep. 20, 2018

(87) PCT Pub. No.: WO2017/164677
PCT Pub. Date: Sep. 28, 2017

(65) Prior Publication Data
US 2019/0099782 A1 Apr. 4, 2019

(30) Foreign Application Priority Data
Mar. 25, 2016 (KR) .................... 10-2016-0036342

(51) Int. Cl.
*B60B 1/04* (2006.01)
*G06F 3/01* (2006.01)
(Continued)

(52) U.S. Cl.
CPC ............ *B06B 1/045* (2013.01); *B06B 1/0207* (2013.01); *G06F 3/016* (2013.01); *H01F 7/064* (2013.01); *H01F 7/17* (2013.01); *H02K 33/16* (2013.01)

(58) Field of Classification Search
CPC .. H02K 33/16; H01F 7/17; H01F 7/06; H01F 7/064; G06F 3/01; G06F 3/016; B06B 1/045; B06B 1/0207
See application file for complete search history.

(56) References Cited

U.S. PATENT DOCUMENTS 5,410,232 A * 4/1995 Lee .................... H02K 7/088
318/568.11
6,483,499 B1 * 11/2002 Li ....................... G06F 3/016
345/156
(Continued)

FOREIGN PATENT DOCUMENTS

DE  102009017081 A1 * 10/2009 ............ G05G 9/047
JP     2008072804 A    3/2008
(Continued)

OTHER PUBLICATIONS

International Search Report; dated Jul. 10, 2017 for PCT Application No. PCT/KR2017/003153.

*Primary Examiner* — Bernard Rojas
(74) *Attorney, Agent, or Firm* — Mendelsohn Dunleavy, P.C.

(57) ABSTRACT

Disclosed is an actuator generating haptic sensations, the actuator having a spherical rotor driven by a magnetic force vector created around the same, a stator having a space corresponding in shape to the spherical rotor defined therein to allow the spherical rotor to be positioned in the space and having a portion of an upper part of the spherical rotor exposed, at least three rotation-driving coils formed in the stator at a given distance from each other to provide the
(Continued)

magnetic force vector to the spherical rotor, and a driving unit independently controlling electric current supplied to each of the rotation-driving coils to create the magnetic force vector.

10 Claims, 6 Drawing Sheets

(51) Int. Cl.
  *H01F 7/06* (2006.01)
  *B06B 1/02* (2006.01)
  *H02K 33/16* (2006.01)
  *B06B 1/04* (2006.01)
  *H01F 7/17* (2006.01)

(56) References Cited

U.S. PATENT DOCUMENTS

| | | | | |
|---|---|---|---|---|
| 6,664,666 | B2 * | 12/2003 | Corcoran | G05G 9/047 310/12.23 |
| 7,176,892 | B2 * | 2/2007 | Kobayashi | G05G 9/047 345/161 |
| 2011/0050405 | A1 * | 3/2011 | Hollis, Jr. | G06F 3/016 340/407.2 |
| 2011/0140818 | A1 * | 6/2011 | Hatanaka | G05G 5/05 335/219 |
| 2014/0203685 | A1 * | 7/2014 | Vandenba Viere | H02K 7/09 310/323.02 |
| 2015/0108938 | A1 * | 4/2015 | Laing | H02P 21/18 318/722 |
| 2019/0184428 | A1 * | 6/2019 | Sreetharan | B06B 1/045 |
| 2019/0280581 | A1 * | 9/2019 | Laor | H02K 37/18 |
| 2020/0130824 | A1 * | 4/2020 | Willinger | B64C 27/12 |

FOREIGN PATENT DOCUMENTS

| | | |
|---|---|---|
| KR | 100284767 B1 | 12/2000 |
| KR | 100568530 B1 | 3/2006 |
| KR | 100825949 B1 | 4/2008 |
| KR | 1020130051101 A | 5/2013 |

* cited by examiner

HAPTIC ACTUATOR WITH LINEAR AND ROTATIONAL MOVEMENT

TECHNICAL FIELD

The present invention relates generally to a haptic actuator and, more particularly, to a haptic actuator including a spherical rotor driven by a magnetic force vector created around the same, a stator having a space corresponding in shape to the spherical rotor defined therein to allow the spherical rotor to be positioned in the space and having a portion of an upper part of the spherical rotor exposed so as to allow the spherical rotor to be linearly moved, at least three rotation-driving coils formed in the stator at a given distance from each other to provide the magnetic force vector to the spherical rotor, and a driving unit independently controlling electric current supplied to each of the rotation-driving coils to create the magnetic force vector.

BACKGROUND ART

Recently, since a low cost head mounted display (HMD) has been introduced, market interest in virtual reality is increasing. As a result, research in various fields related to virtual reality is being conducted, and as a result, various types of hardware and software products are being released.

Haptic technology is one of research fields for transferring information to users through a touch sensation in order to enhance a sense of presence in the virtual reality by transferring various kinds of sensations to users.

Particularly, development and research on a device for providing the touch sensation to a user's fingertip have been continuously carried out.

As a device for generating such haptic sensations, there are various methods and devices, such as a method of stimulating a fingertip by manufacturing electromagnet actuators or pneumatic actuators capable of moving up and down in a small size and arranging them in an array form, a method of stimulating a finger surface using an ultrasonic wave, and a method of stimulating a fingertip using a film-type actuator that is developed using a nano technology, but there is a difficulty in securing stability and reliability of such devices.

In addition, a belt-type haptic actuator has been proposed as a device for giving a sliding sensation. However, the belt-type haptic actuator has a limitation in that it can only give the sliding sensation in one direction with one degree of freedom.

Accordingly, the present inventor proposes a haptic actuator that is secured with stability and reliability and is capable of providing a vibrating sensation (contact feeling), a pressure sensation, and a sliding sensation in any direction.

DISCLOSURE

Technical Problem

Accordingly, the present invention has been made to solve all of the above problems.

Another object of the present invention is to provide a haptic actuator that is capable of creating a sliding sensation in all directions.

It is another object of the present invention to provide a haptic actuator capable of creating a vibrating sensation and a pressure sensation.

Technical Solution

In order to achieve the above-described object of the present invention and to realize the characteristic effects of the present invention described below, the characteristic configuration of the present invention is as follows.

According to another aspect of the present invention, there is provided an actuator generating haptic sensations, the actuator including a spherical rotor driven by a magnetic force vector created around the same; a stator having a space corresponding in shape to the spherical rotor defined therein to allow the spherical rotor to be positioned in the space and having a portion of an upper part of the spherical rotor exposed; at least three rotation-driving coils formed in the stator at a given distance from each other to provide the magnetic force vector to the spherical rotor; and a driving unit independently controlling electric current supplied to each of the rotation-driving coils to create the magnetic force vector.

Advantageous Effects

According to the present invention having the above-described characteristics, it is possible to transfer sliding sensations in all directions to a user, thereby enhancing a sense of presence in virtual/augmented reality.

In addition, the present invention can transfer a vibrating sensation and a pressure sensation to a user, thereby enhancing a sense of presence in virtual/augmented reality.

MODE FOR INVENTION

Figure 1A:
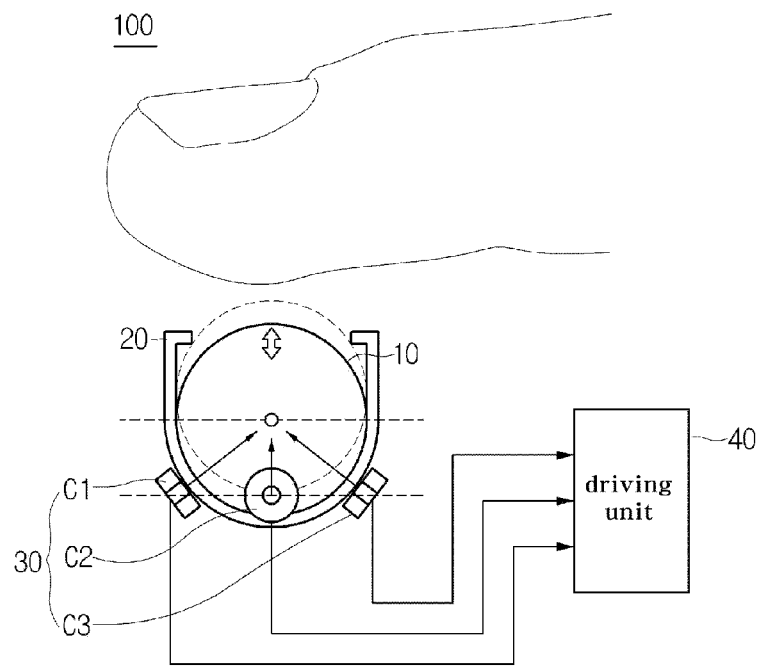
FIGS. 1A and 1B are views schematically illustrating a haptic actuator according to an embodiment of the present invention.

The following detailed description of the invention refers to the accompanying drawings, which illustrate, by way of example, specific embodiments in which the invention may be practiced. These embodiments are described in sufficient detail to enable those skilled in the art to practice the invention. It should be understood that the various embodiments of the present invention are different, but need not be mutually exclusive. For example, certain features, structures, and characteristics described herein may be implemented in other embodiments without departing from the spirit and scope of the invention in connection with one embodiment. It is also to be understood that the position or arrangement of the individual components within each disclosed embodiment may be varied without departing from the spirit and scope of the invention. The following detailed description is, therefore, not to be taken in a limiting sense, and the scope of the present invention is to be limited only by the appended claims, along with the full scope of equivalents to which such claims are entitled, if properly explained. In the drawings, like reference numerals refer to the same or similar functions throughout the several views.

Hereinafter, preferred embodiments of the present invention will be described in detail with reference to the accompanying drawings, so that those skilled in the art can easily carry out the present invention.

Figure 1B:
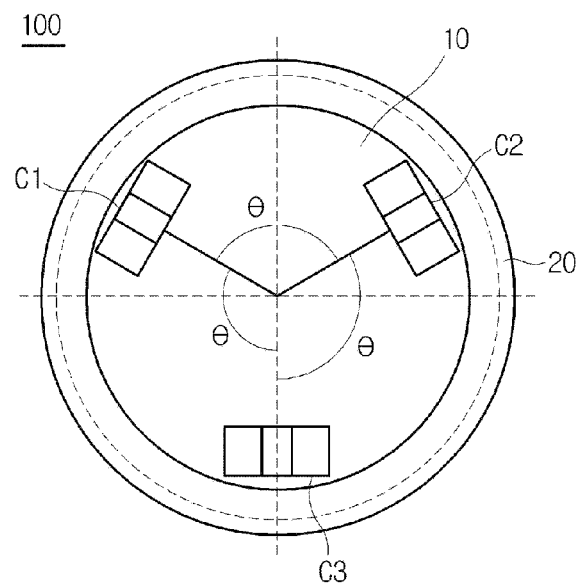

FIGS. 1A and 1B are views schematically illustrating a haptic actuator according to an embodiment of the present invention, in which FIG. 1A is a perspective view and (FIG. 1B is a plan view.

Referring to FIGS. 1A and 1B, a haptic actuator 100 according to an embodiment of the present invention may include a spherical rotor 10, a stator 20, rotation-driving coils 30, and a driving unit 40.

First, the spherical rotor 10 is driven by a magnetic force vector created around the same to provide haptic sensations to the human body. The spherical rotor 10 may be formed of a permanent magnet. In this case, when the spherical rotor 10 is virtually divided by a horizontal plane passing through the center thereof, the spherical rotor 10 is configured to be divided into an upper polarity and a lower polarity. Unlike the case where the spherical rotor 10 is formed of the permanent magnet, the permanent magnets whose polarities are opposite to each other may be also positioned inside the upper and lower regions, respectively.

In addition, the stator 20 has a space corresponding in shape to the spherical rotor 10 formed therein, and the spherical rotor 10 may be positioned in the space formed therein. In addition, the stator 20 may be configured to allow an upper part of the spherical rotor 10 to be exposed. That is, a portion of the spherical rotor 10 protrudes from the stator 20 to make it possible to be brought into contact with the human body. Herein, the spherical rotor 10 is provided to be rotatable in the inner space of the stator 20.

In addition, a region of the stator 20 in which the upper part of the spherical rotor 10 is located may have a predetermined gap so that the spherical rotor 10 may move upward and downward in the inner space. For example, the lower region in the inner space of the stator 20 is provided to correspond to the lower hemisphere of the spherical rotor 10, and the upper region in the inner space of the stator 20 is provided to form a cylindrical space having a certain region of the upper surface opened and to allow the opened region of the upper surface to have a diameter greater than the spherical rotor 10 with respect to the same plane.

In addition, at least three rotation-driving coils 30 are formed in the stator 20 at a predefined distance (for example, equivalent distance) on a virtual predetermined plane passing through the spherical rotor 10, in order to provide the magnetic force vector to the spherical rotor 10. In this case, the rotation-driving coils 30 may be formed outside the stator 20 or may be formed in such a manner as to face the spherical rotor 10 inside the body of the stator 20.

In addition, the rotation-driving coils 30 may be located on a horizontal plane of planes passing through a region other than the center of the spherical rotor 10.

In addition, the driving unit 40 may be provided such that the electric current supplied to each of the rotation-driving coils 30 is individually controlled to form the magnetic force vector caused by the rotation-driving coils 30. In this case, the driving unit 40 may control the direction and magnitude of the magnetic force vector of each of the rotation-driving coils 30 by controlling the electric current, in order to create a rotational movement, a vibration movement, or a linear movement of the spherical rotor 10, thereby creating haptic sensations.

Figure 2A:
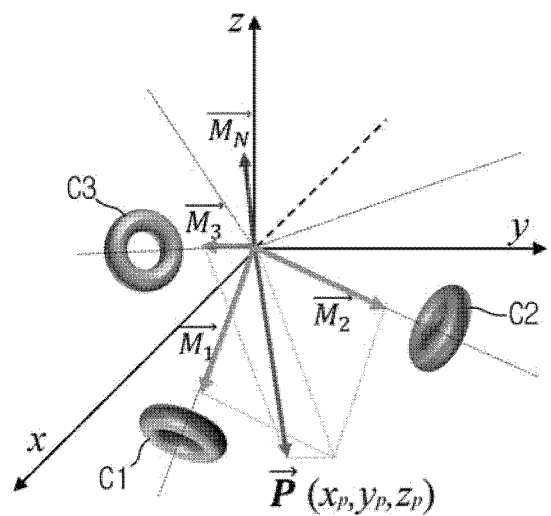
FIGS. 2A-2C are views schematically illustrating a magnetic force vector for explaining an operation of the haptic actuator according to an embodiment of the present invention.
Figure 2B:
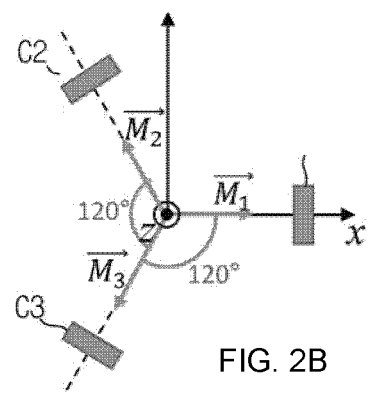
Figure 2C:
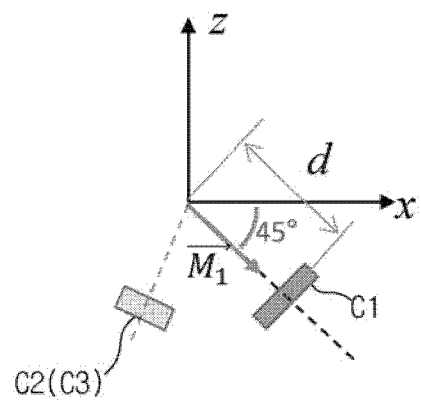

FIGS. 2A-2C are views schematically illustrating a magnetic force vector to explain an operation of the haptic actuator according to an embodiment of the present invention, in which FIG. 2A is a state view, FIG. 2B is a plan view, and FIG. 2C is a side view.

The operation of the haptic actuator according to one embodiment of the present invention will be described with reference to FIGS. 2A-2C.

The operation will be described assuming that the rotation-driving coil C1, the rotation-driving coil C2, and the rotation-driving coil C3 head for the center point (hereinafter, referred to as "origin") of the spherical rotor, and each coil is formed at the positions of $$\left(\frac{d\sqrt{2}}{2}, 0, -\frac{d\sqrt{2}}{2}\right), \left(-\frac{d\sqrt{2}}{4}, \frac{d\sqrt{6}}{4}, -\frac{d\sqrt{2}}{2}\right),$$

$$\left(-\frac{d\sqrt{2}}{4}, -\frac{d\sqrt{6}}{4}, -\frac{d\sqrt{2}}{2}\right).$$

Where, d is a constant, which is a distance from the origin to the coil.

According to the above assumption, the magnetic force vector $\vec{M_1}$ of the rotation-driving coil C1, the magnetic force vector $\vec{M_2}$ of the rotation-driving coil C2, and the magnetic force vector $\vec{M_3}$ of the rotation-driving coil C3 may be expressed by the following Equation 1.

$$\vec{M_1} = \left(\frac{|\vec{M_1}|\sqrt{2}}{2}, 0, -\frac{|\vec{M_1}|\sqrt{2}}{2}\right) \quad \langle\text{Equation 1}\rangle$$

$$\vec{M_2} = \left(-\frac{|\vec{M_2}|\sqrt{2}}{4}, \frac{|\vec{M_2}|\sqrt{6}}{4}, -\frac{|\vec{M_2}|\sqrt{2}}{2}\right)$$

$$\vec{M_3} = \left(-\frac{|\vec{M_3}|\sqrt{2}}{4}, -\frac{|\vec{M_3}|\sqrt{6}}{4}, -\frac{|\vec{M_3}|\sqrt{2}}{2}\right)$$

Where, $\vec{M_1}$, $\vec{M_2}$, $\vec{M_3}$ are the magnitude of the magnetic force vector of each of the rotation-driving coil C1, the rotation-driving coil C2, and the rotation-driving coil C3, respectively.

In addition, the magnetic force vector $\vec{M_N}$ of the spherical rotor may be expressed by following Equation 2.

$$\vec{M_N} = -\frac{\vec{P}}{|\vec{P}|}|\vec{M_N}| \quad \langle\text{Equation 2}\rangle$$

Accordingly, the magnetic force vector $\vec{P}(xp,yp,zp)$ created by the rotation-driving coils C1, C2, and C3 and the magnitude of the magnetic force of each of the rotation-driving coils C1, C2, and C3 have a relationship expressed by the following Equation 3 through a combination of vectors.

$$\begin{bmatrix} x_P \\ y_P \\ z_P \end{bmatrix} = \qquad \langle\text{Equation 3}\rangle$$

$$|\vec{M_1}|\begin{bmatrix} \sqrt{2}/2 \\ 0 \\ -\sqrt{2}/2 \end{bmatrix} + |\vec{M_2}|\begin{bmatrix} -\sqrt{2}/4 \\ \sqrt{6}/4 \\ -\sqrt{2}/2 \end{bmatrix} + |\vec{M_3}|\begin{bmatrix} -\sqrt{2}/4 \\ -\sqrt{6}/4 \\ -\sqrt{2}/2 \end{bmatrix} =$$

$$\begin{bmatrix} \sqrt{2}/2 & -\sqrt{2}/4 & -\sqrt{2}/4 \\ 0 & \sqrt{6}/4 & -\sqrt{6}/4 \\ -\sqrt{2}/2 & -\sqrt{2}/2 & -\sqrt{2}/2 \end{bmatrix} \begin{bmatrix} |\vec{M_1}| \\ |\vec{M_2}| \\ |\vec{M_3}| \end{bmatrix}$$

Accordingly, when the magnetic force vector $\vec{P}$(xp,yp,zp) is known in Equation 3, the magnitude of the magnetic force of each of the rotation-driving coils C1, C2, and C3 is expressed by the following Equation 4.

$$\begin{bmatrix} |\vec{M_1}| \\ |\vec{M_2}| \\ |\vec{M_3}| \end{bmatrix} = J^{-1}\vec{P} = \begin{bmatrix} \sqrt{2}/2 & -\sqrt{2}/4 & -\sqrt{2}/4 \\ 0 & \sqrt{6}/4 & -\sqrt{6}/4 \\ -\sqrt{2}/2 & -\sqrt{2}/2 & -\sqrt{2}/2 \end{bmatrix}^{-1} \begin{bmatrix} x_P \\ y_P \\ z_P \end{bmatrix} \qquad \langle\text{Equation 4}\rangle$$

Accordingly, the driving unit may drive the spherical rotor for generating haptic sensations by controlling the electric current supplied to each coil to create the magnetic force according to Equation (4) to create the magnetic force vector $\vec{P}$(xp,yp,zp) for controlling the position of the spherical rotor.

Figure 3A:
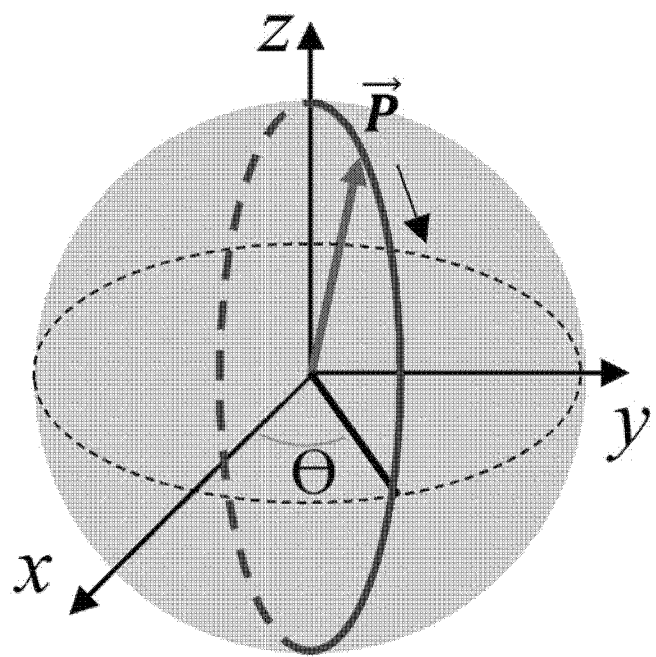
FIGS. 3A and 3B are views schematically illustrating a trajectory of a magnetic force vector for the operation of a haptic actuator according to an embodiment of the present invention.
Figure 3B:
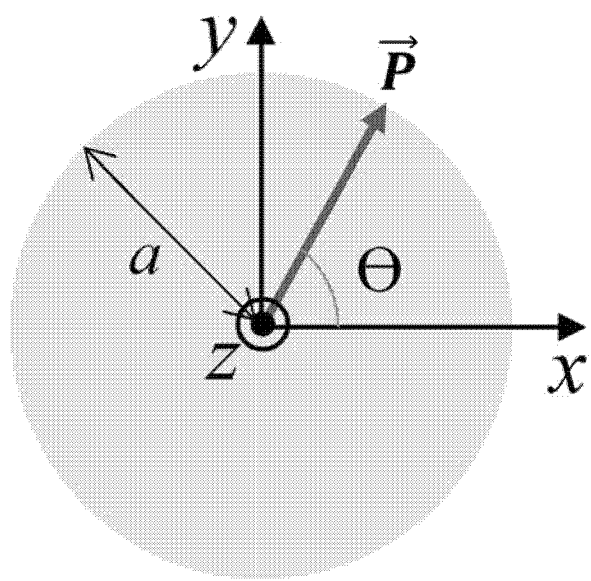

FIGS. 3A and 3B are views schematically illustrating a trajectory of a magnetic force vector for the operation of a haptic actuator according to an embodiment of the present invention, in which FIG. 3A is a state view and FIG. 3B is a plan view.

Referring to FIGS. 3A and 3B, the operation of rotating the spherical rotor through the rotation-driving coils C1, C2, and C3 in FIGS. 2A-2C will now be described.

First, as shown in FIGS. 3A and 3B, a trajectory created by rotating the magnetic force vector $\vec{P}$ in the direction at an angle of θ with respect to the x-axis is as shown in Equation 5 below.

$$\vec{P} = \begin{bmatrix} a\cos\theta\sin\omega t \\ a\sin\theta\sin\omega t \\ a\sin\omega(t-\pi/2) \end{bmatrix} \qquad \langle\text{Equation 5}\rangle$$

Where, in Equation 5, t is time and ω is angular velocity.

As can be seen from the Equation 5, the rotation angle of $\vec{P}$ may be changed by changing θ and the rotation speed may be changed by changing ω.

In addition, the magnitude of the magnetic force of the rotation-driving coils with respect to the magnetic force vector $\vec{P}$ is as shown in Equation 6.

$$\vec{M} = \begin{bmatrix} |\vec{M_1}| \\ |\vec{M_2}| \\ |\vec{M_3}| \end{bmatrix} = J^{-1}\vec{P} \qquad \langle\text{Equation 6}\rangle$$

Accordingly, the driving unit controls the input electric current of each of the rotation-driving coils according to Equation 5 and Equation 6 according to the trajectory of the magnetic force vector $\vec{P}$ that is set or input.

If the rotation-driving coils form the trajectory of the magnetic force vector $\vec{P}$ by controlling the electric current through the driving unit, the magnetic force vector of the spherical rotor also forms a trajectory along the magnetic force vector $\vec{P}$ of the rotation-driving coils.

Therefore, by configuring the trajectory of the magnetic force vector $\vec{P}$ caused by the rotation-driving coils variously, it is possible to implement various rotational movements of the spherical rotor, which results that the human body that is in contact with the spherical rotor has various senses, that is, sliding sensations in various directions.

Also, in order to provide a pressure sensation in the human body that is in contact with the spherical rotor, the magnetic force vector $\vec{P}$ caused by the rotation-driving coils may be formed as shown in Equation 7.

$$\vec{P} = (0,0,a) \qquad <\text{Equation 7}>$$

Herein, in Equation 7, when the magnetic force vector $\vec{P}$ is adjusted with respect to the z-axis, that is, the magnitude of the constant a is adjusted, it is possible to control the pressure sensation of the spherical magnet. Herein, the z-axis may be the up-and-down moving direction so that the spherical rotor protrudes in FIGS. 1A and 1B.

Then, the magnitude of the magnetic force of the rotation-driving coils for forming the magnetic force vector $\vec{P}$ of Equation 7 becomes as shown in Equation 8.

$$\vec{M} = J^{-1}\vec{P} \qquad <\text{Equation 8}>$$

Accordingly, in order to give different pressure sensations according to movements of the spherical rotor, the driving unit controls the electric current inputted to the respective rotation-driving coils according to Equations 7 and 8.

Also, to provide a vibrating sensation in the human body that is in contact with the spherical rotor, the magnetic force vector $\vec{P}$ by the rotation-driving coils may be formed as shown in Equation 9.

$$\vec{P} = (0,0,a\sin\omega t) \qquad <\text{Equation 9}>$$

Herein, in Equation 9, by setting the trajectory for the magnetic force vector $\vec{P}$ with respect to the z-axis, the vibrating sensation may be adjusted. That is, as the constant a increases, the magnitude of the force in the vibrating sensation increases, and as ω increases, the frequency of the sensation of vibration increases.

Then, the magnitude of the magnetic force of the rotation-driving coils for forming the magnetic force vector $\vec{P}$ of Equation 9 is expressed as shown in Equation 10.

$$\vec{M} = J^{-1}\vec{P} \qquad <\text{Equation 10}>$$

Therefore, in order to generate different vibrating sensations according to movements of the spherical rotor, the driving unit controls the electric current input to each of the rotation-driving coils according to Equations 9 and 10.

Figure 4A:
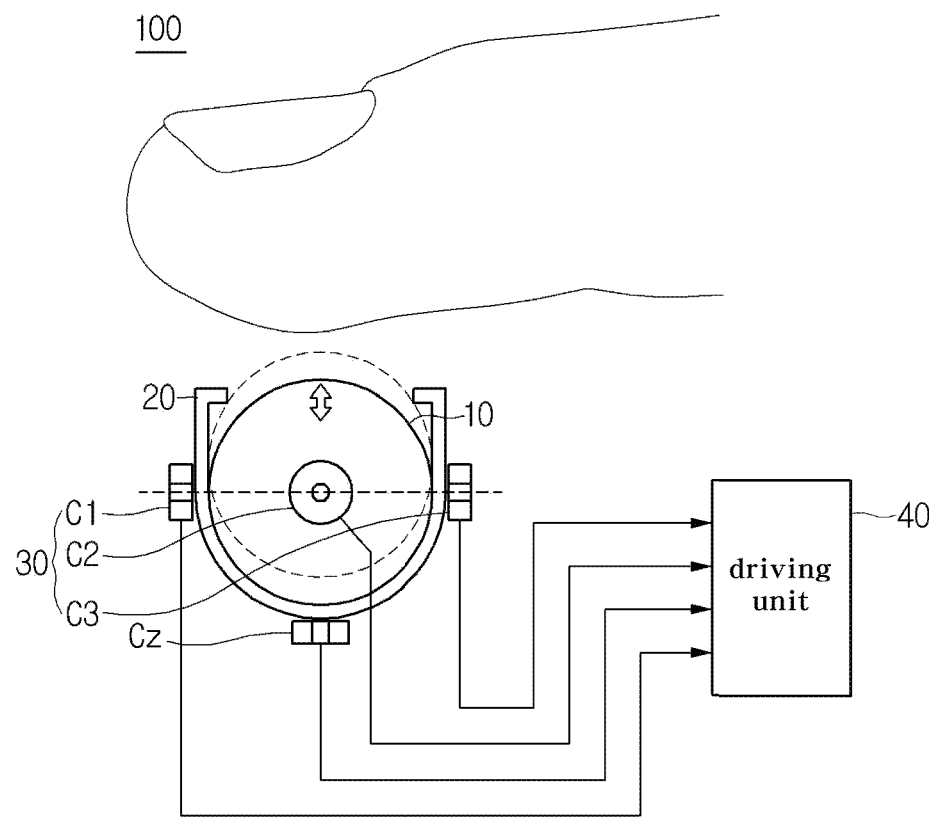
FIGS. 4A and 4B are views schematically illustrating a haptic actuator according to another embodiment of the present invention.
Figure 4B:
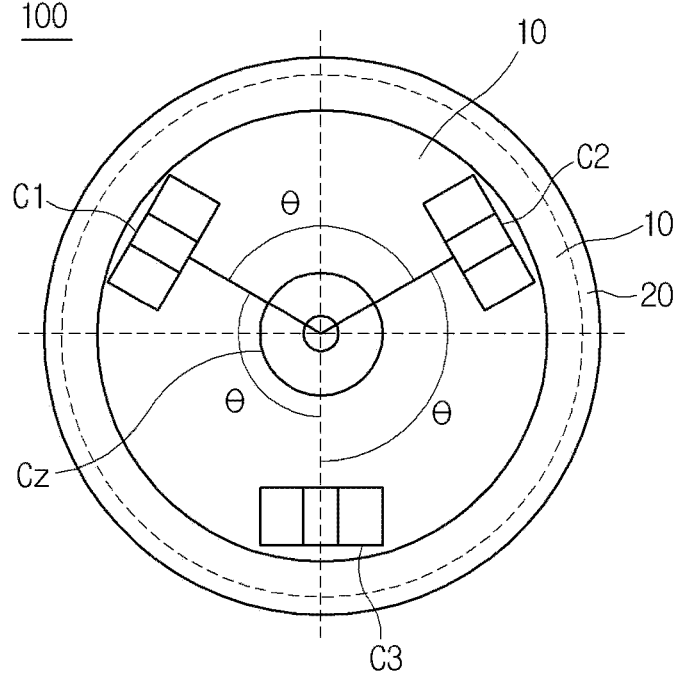

FIGS. 1A and 1B are views schematically illustrating a haptic actuator according to another embodiment of the present invention, which is a configuration having one central driving coil Cz added to the embodiment of FIGS. 1A and 1B, in which (FIG. 4A is a perspective view and FIG. 4B is a plan view.

The central driving coil Cz may be positioned in the stator 20 below the lower region of the spherical rotor 10, in a direction perpendicular to the horizontal plane passing through the spherical rotor 10. The central driving coil Cz may provide the magnetic force vector to the spherical rotor 10. In this case, the central driving coil Cz may be formed outside the stator 20 or may be formed in such a manner as to face the spherical rotor 10 inside the body of the stator 20.

In addition, the rotation-driving coils 30 may be positioned on a horizontal plane of planes passing through the center of the spherical rotor 10, or on a horizontal plane of planes passing through regions other than the center of the spherical rotor 10.

The driving unit 40 may be provided such that the electric current supplied to each of the rotation-driving coils 30 and the central driving coil Cz is controlled to form the magnetic force vectors caused by the rotation-driving coils 30 and the central driving coil Cz. In this case, the driving unit 40 controls the direction and the magnitude of the magnetic force vector of each of the rotation-driving coils 30 and the central driving coil Cz by controlling the electric current, in order to create a rotational movement, a vibration movement, or a linear movement of the spherical rotor 10, thereby generating haptic sensations. In this case, assuming that the control sections are equally divided on the virtual plane on which the rotation-driving coils 30 are located, the driving unit 40 controls the direction and the magnitude of the magnetic force vector of each of at least two rotation-driving coils 30 and the central driving coil Cz positioned in the divided control section, thereby creating the rotational movement, the vibration movement, or the linear movement in the spherical rotor 10.

Also, the driving unit 40 may control the direction and magnitude of the magnetic force vector of the central driving coil Cz to form the vibration movement or the linear movement for pressure formation in the spherical rotor 10.

Figure 5A:
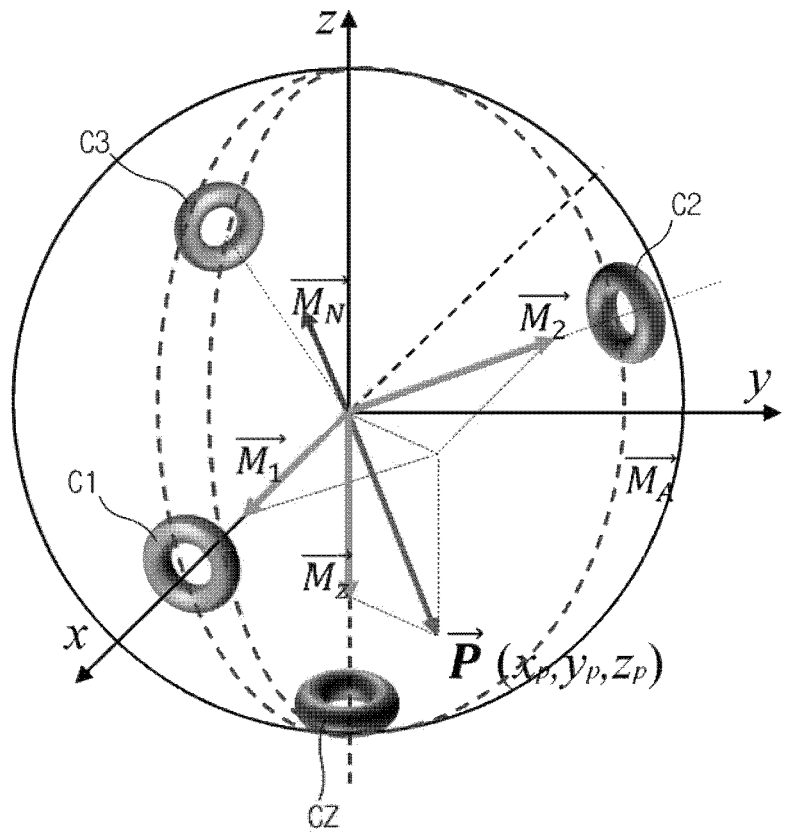
FIGS. 5A and 5B are views schematically illustrating a magnetic force vector for explaining the operation of the haptic actuator according to another embodiment of the present invention.
Figure 5B:
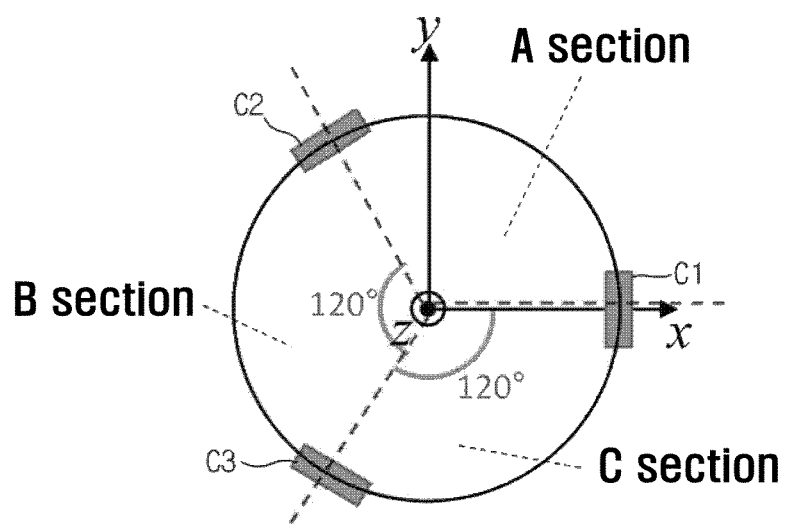
Figure 6A:
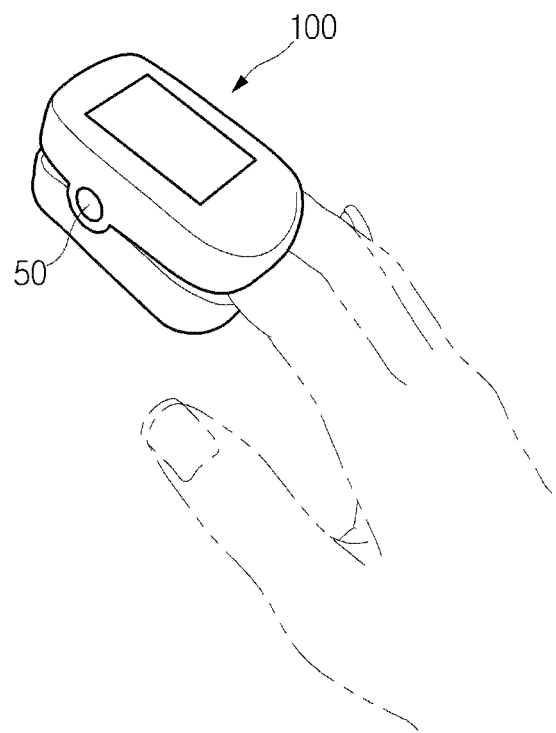
FIGS. 6A and 6B are views schematically illustrating states in which a haptic actuator is applied according to an embodiment of the present invention.
Figure 6B:
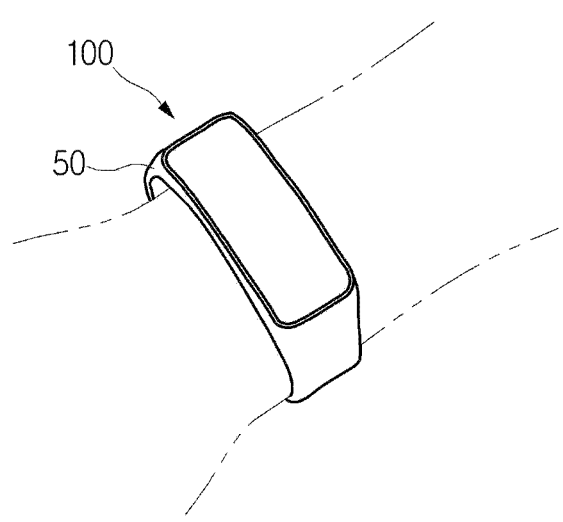

FIGS. 5A and 5B are views schematically illustrating the magnetic force vector to explain an operation of a haptic actuator according to another embodiment of the present invention, in which (FIG. 5A is a state view and FIG. 5B is a plan view.

The operation of the haptic actuator according to another embodiment of the present invention will be described with reference to FIGS. 5A and 5B.

First, the operation will be described assuming that the rotation-driving coil C1, the rotation-driving coil C2, the rotation-driving coil C3, and the central driving coil Cz head for the center point, i.e., the origin of the spherical rotor, and each coil is formed at the positions of $$(d, 0, 0), \left(-\frac{d}{2}, \frac{d\sqrt{3}}{2}, 0\right), \left(-\frac{d}{2}, -\frac{d\sqrt{3}}{2}, 0\right), (0, 0, -d).$$

Where, d is a constant, which is a distance from the origin to the coil.

According to the above assumption, the magnetic force vector $\vec{M_1}$ of the rotation-driving coil C1, the magnetic force vector $\vec{M_2}$ of the rotation-driving coil C2, the magnetic force vector $\vec{M_3}$ of the rotation-driving coil C3, and the magnetic force vector $\vec{M_Z}$ of the central driving coil Cz may be expressed by the following Equation 11.

$$\vec{M_1} = (|\vec{M_1}|, 0, 0) \qquad \langle \text{Equation 11} \rangle$$

$$\vec{M_1} = \left(-\frac{|\vec{M_2}|}{2}, \frac{|\vec{M_2}|\sqrt{3}}{2}, 0\right)$$

$$\vec{M_3} = \left(-\frac{|\vec{M_2}|}{2}, -\frac{|\vec{M_2}|\sqrt{3}}{2}, 0\right)$$

$$\vec{M_Z} = (0, 0, -|\vec{M_Z}|)$$

Where, $\vec{M_1}$, $\vec{M_2}$, $\vec{M_3}$, $\vec{M_Z}$ are the magnitude of the magnetic force of each of the rotation-driving coil C1, the rotation-driving coil C2, the rotation-driving coil C3, and the central driving coil Cz.

In addition, the magnetic force vector $\vec{M_N}$ of the spherical rotor may be expressed as following Equation 12.

$$\vec{M_N} = -\frac{\vec{P}}{|\vec{P}|}|\vec{M_N}| \qquad \langle \text{Equation 12} \rangle$$

Accordingly, it is possible to create the magnetic force vector $\vec{P}$ for driving the spherical rotor by acquiring a sum of the magnetic force vectors of the rotation-driving coil C1, the rotation-driving coil C2, the rotation-driving coil C3, and the central driving coil Cz. In this case, when the magnetic force vector $\vec{P}$ is created, the S pole of the spherical rotor is rotatably moved to head for the magnetic force vector $\vec{P}$, so that the spherical rotator may be controlled in such a manner as to be driven in various directions by controlling the driving electric current of each coil to create the magnetic force vector $\vec{P}$.

The magnetic force vector $\vec{P}(x_p, y_p, z_p)$ created by the rotation-driving coils C1, C2, and C3 and the central driving coil Cz, and the magnitude of the magnetic force of each of the rotation-driving coils C1, C2, and C3, and the central driving coil Cz has a relationship expressed in the following Equation 13 through a combination of vectors.

$$\begin{bmatrix} x_p \\ y_p \\ z_p \end{bmatrix} = |\vec{M_1}| \begin{bmatrix} 1 \\ 0 \\ 0 \end{bmatrix} + |\vec{M_2}| \begin{bmatrix} -1/2 \\ \sqrt{3}/2 \\ 0 \end{bmatrix} + \qquad \langle \text{Equation 13} \rangle$$

$$|\vec{M_z}| \begin{bmatrix} 0 \\ 0 \\ -1 \end{bmatrix} = \begin{bmatrix} 1 & -1/2 & 0 \\ 0 & \sqrt{3}/2 & 0 \\ 0 & 0 & -1 \end{bmatrix} \begin{bmatrix} |\vec{M_1}| \\ |\vec{M_2}| \\ |\vec{M_z}| \end{bmatrix}$$

Herein, when xp>0 and yp>0, $\vec{P}$(xp,yp,zp) may be expressed as following Equation 14 using the magnetic force of the rotation-driving coils C1 and C2 and the central driving coil Cz.

$$\begin{bmatrix} |\vec{M_1}| \\ |\vec{M_2}| \\ |\vec{M_z}| \end{bmatrix} = J^{-1}\vec{P} = \begin{bmatrix} 1 & -1/2 & 0 \\ 0 & \sqrt{3}/2 & 0 \\ 0 & 0 & -1 \end{bmatrix}^{-1} \begin{bmatrix} x_p \\ y_p \\ z_p \end{bmatrix} \quad \langle\text{Equation 14}\rangle$$

That is, as shown FIG. 5B, sections A, B, and C may be equally divided according to the position of each of the rotation-driving coils C1, C2, and C3 with respect to the origin, for example, at a distance of 120 degrees, in order to control the magnetic force vector $\vec{P}$.

In this case, the rotation-driving coil C1, the rotation-driving coil C2, and the central driving coil Cz are used when the magnetic force vector $\vec{P}$ is to be created within the section A, the rotation-driving coil C2, the rotation-driving coil C3, and the central driving coil Cz are used when the magnetic force vector $\vec{P}$ is to be created within the section B, and the rotation-driving coil C1, the rotation-driving coil C3, and the central driving coil Cz are used when the magnetic force vector $\vec{P}$ is to be created within the section C.

A method of creating the magnetic force of each coil to create the control section and the magnetic force vector $\vec{P}$ will now be described.

First, considering that a vector acquired by projecting) the magnetic force vector $\vec{P}$(xp,yp,zp) on the xy plane is $\vec{P}$(xp,yp), and the angle between the $\vec{P}$(xp,yp) and the x axes is θ, θ may be acquired according to the following Equation 15 according to the conditions of xp and yp.

$$\begin{aligned} &\text{i) } xp \geq 0, yp \geq 0: \theta = \tan^{-1}\left(\frac{|y_p|}{|x_p|}\right) \\ &\text{ii) } xp < 0, yp \geq 0: \theta = \pi - \tan^{-1}\left(\frac{|y_p|}{|x_p|}\right) \\ &\text{iii) } xp < 0, yp < 0: \theta = \pi + \tan^{-1}\left(\frac{|y_p|}{|x_p|}\right) \\ &\text{iv) } xp \geq 0, yp < 0: \theta = 2\pi - \tan^{-1}\left(\frac{|y_p|}{|x_p|}\right) \end{aligned} \quad \langle\text{Equation 15}\rangle$$

In addition, a relationship between the magnetic force vector $\vec{P}$(xp,yp,zp), the rotation-driving coils, and the central driving coil according to θ, i.e., the control section may be derived as shown in Equation 16 below.

$$\text{i) } 0 \leq \theta < \frac{2}{3}\pi \quad \langle\text{Equation 16}\rangle$$

$$\begin{bmatrix} |\vec{M_1}| \\ |\vec{M_2}| \\ |\vec{M_z}| \end{bmatrix} = \begin{bmatrix} 1 & -1/2 & 0 \\ 0 & \sqrt{3}/2 & 0 \\ 0 & 0 & -1 \end{bmatrix}^{-1} \begin{bmatrix} x_p \\ y_p \\ z_p \end{bmatrix}$$

$$\text{ii) } \frac{2}{3}\pi \leq \theta < \frac{4}{3}\pi$$

$$\begin{bmatrix} |\vec{M_2}| \\ |\vec{M_3}| \\ |\vec{M_z}| \end{bmatrix} = \begin{bmatrix} -1/2 & -1/2 & 0 \\ \sqrt{3}/2 & -\sqrt{3}/2 & 0 \\ 0 & 0 & -1 \end{bmatrix}^{-1} \begin{bmatrix} x_p \\ y_p \\ z_p \end{bmatrix}$$

$$\text{iii) } \frac{4}{3}\pi \leq \theta < 2\pi$$

$$\begin{bmatrix} |\vec{M_3}| \\ |\vec{M_1}| \\ |\vec{M_z}| \end{bmatrix} = \begin{bmatrix} -1/2 & 1 & 0 \\ -\sqrt{3}/2 & 0 & 0 \\ 0 & 0 & -1 \end{bmatrix}^{-1} \begin{bmatrix} x_p \\ y_p \\ z_p \end{bmatrix}$$

Accordingly, the driving unit may drive the spherical rotor by controlling the electric current supplied to each coil to create the magnetic force according to Equation 16, in order to create the magnetic force vector $\vec{P}$(xp,yp,zp) for controlling the position of the spherical rotor, thereby generating haptic sensations.

The invention claimed is:

1. An actuator generating haptic sensations, the actuator comprising:
   a spherical rotor that is a permanent magnet divided into an upper polarity and a lower polarity by a virtual horizontal plane passing through the center thereof and driven by a magnetic force vector created around the same;
   a stator having a space corresponding in shape to the spherical rotor defined therein to allow the spherical rotor to be positioned in the space and having a portion of an upper part of the spherical rotor exposed;
   at least three rotation-driving coils formed in the stator at a given distance from each other to provide the magnetic force vector to the spherical rotor;
   a central driving coil formed in a region of the stator corresponding to a lower region of the spherical rotor to provide a magnetic force vector of a linear movement to the spherical rotor, the region of the stator being perpendicular to a virtual plane in which the rotation-driving coils are arranged; and
   a driving unit independently controlling electric current supplied to each of the rotation-driving coils and the central driving coil to create the magnetic force vector.

2. The actuator of claim 1, wherein the rotation-driving coils are positioned on the virtual horizontal plane passing through a center of the spherical rotor.

3. The actuator of claim 1, wherein the rotation-driving coils are positioned on the virtual horizontal plane passing through a region other than a center of the spherical rotor.

4. The actuator of claim 1, wherein the driving unit controls a direction and a magnitude of the magnetic force vector of each of the rotation-driving coils to create a rotational movement, a vibration movement, and a linear movement in the spherical rotor.

5. The actuator of claim 1, wherein the control sections are equally divided on the virtual plane in which the rotation-driving coils are positioned, and the driving unit controls a direction and a magnitude of the magnetic force vector of each of at least two rotation-driving coils and the central driving coil corresponding to a certain control section of the divided control sections to create a rotational movement, a vibration movement, or a linear movement in the spherical rotor.

6. The actuator of claim 1, wherein the driving unit controls a direction and a magnitude of the magnetic force vector of the central driving coil to create a rotational movement, a vibration movement, or a linear movement in the spherical rotor.

7. The actuator of claim 1, further comprising:
a sensing unit detecting a posture of the spherical rotor, in which the driving unit controls electric current applied to each of the rotation-driving coils or the central driving coil in a feedback manner using a measurement value on the posture of the spherical rotor detected by the sensing unit.

8. The actuator of claim 1, further comprising a coupling unit for holding the stator to a human body, wherein a portion of the spherical rotor exposed from the stator is in contact with the human body.

9. The actuator of claim 1, further comprising:
a sensing unit detecting a posture of the spherical rotor, in which the driving unit controls electric current applied to each of the rotation-driving coils or the central driving coil in a feedback manner using a measurement value on the posture of the spherical rotor detected by the sensing unit.

10. The actuator of claim 1, further comprising a coupling unit for holding the stator to a human body, wherein a portion of the spherical rotor exposed from the stator is in contact with the human body.

* * * * *